INVENTOR.
A. L. HUBBARD

United States Patent Office 2,876,611
Patented Mar. 10, 1959

2,876,611

COTTON HARVESTER MOISTENER ASSEMBLY

Arthur L. Hubbard, Madrid, Iowa, assignor, by mesne assignments, to Deere & Company, a corporation of Delaware Application February 14, 1958, Serial No. 715,465

14 Claims. (Cl. 56—41)

This invention relates to a moistening mechanism for use in a cotton harvester and more particularly this invention relates to a fluid distributor used in the moistening mechanism.

A typical cotton picker of the general character referred to is disclosed in the U. S. patent to Johnson 2,140,631. The cotton picker of the nature disclosed therein comprises a mobile carrying frame on which is mounted the cotton picker or harvesting unit. Each picking unit includes a rotatable drum having a plurality of circumferencially spaced columns from each of which projects a vertical series of picker spindles, the spindles being thus arranged in vertically arranged horizontal layers with each spindle being rotatable on its own axis in addition to being carried through a horizontal orbit because of rotation of the drum. The spindles are normally barbed so as to improve their affinity for snagging the cotton fibers as the spindles move through the cotton plant. It is conventional to supply moisture to the spindles prior to their entrance into the cotton plants. The addition of moisture has been found to increase the picking capacity of the spindles, to minimize the accumulation on the spindles of plant juices and other foreign matter, and to facilitate doffing or wiping of the cotton from the spindles.

In one form of a conventional cotton harvester, the means for supplying moisture or fluid to the spindles comprises a vertical series of moistening pads spaced apart on the order of the vertical spacing of the spindles so that the spindles of each layer passes below and in contact with the moistener pads. Fluid is supplied to the pads by generally a complicated series of valves and conduits which are both expensive to manufacture and somewhat expensive to maintain. There are several problems basically encountered in supplying fluid to the moistening pads. Since the series of pads must be vertically spaced or stacked, there actually exists the problem of head created by the fluid and since it is normally conventional to supply fluid from the top of the stack, there is created a greater head on the lower pads than at the upper pads. Thus, in order that an equal quantity of fluid is provided for each pad, there must exist some compensating mechanism to offset the head created by the fluid. In some instances where there exists no compensation, the quantity of fluid is regulated whereby the centrally positioned moistening pads are fed the correct quantity of fluid and the pads positioned above and below the central pads are permitted to have either a smaller quantity or larger quantity of fluid dependent upon their position in the stack. As may be recognized, while in many instances such control is satisfactory, there are many times due to crop and moisture conditions, that such a control is unsatisfactory.

It is therefore the primary object of this invention to provide a moistening mechanism for use with a cotton harvester which features a metering mechanism which limits and fixes the quantity of fluid fed to each of the moistening pads. By properly metering the quantity of fluid so that only a fixed quantity is fed to the pads, the effect of head on the fluid itself has no effect.

In the above mentioned metering or moistening apparatus, there is featured a reciprocating member moving vertically relative to the moistening pads which has a plurality of vertically spaced metering pockets therein which when moved to one position will be filled with liquid, and when moved to a second position will be alined with the conduit means connected to the moistening pads so that the fluid collected therein will flow to the pads. In the second position there will be no direct connection between the metering pockets and the fluid supply and consequently no pressure or effect of head will affect the quantity of fluid flowing into the pads.

Other objects and advantages of the present invention will become apparent to those skilled in the art as the nature of the invention is better understood from the following description and as shown in the accompanying drawings.

Figure 1:
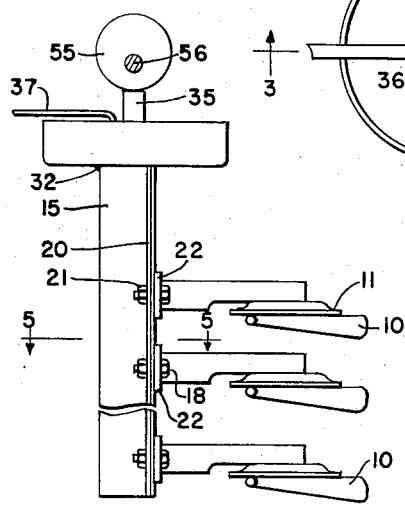
Fig. 1 is a side elevation of portions of the moistening apparatus and portions of the associated cotton picking spindles.
Figure 2:
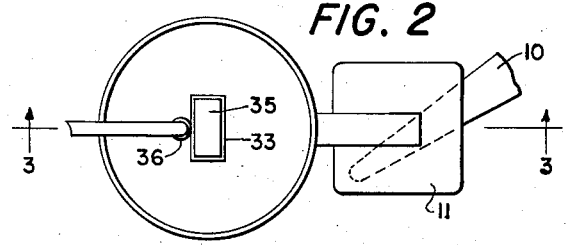
Fig. 2 is a plan view with parts omitted of the apparatus shown in Fig. 1.
Figure 5:
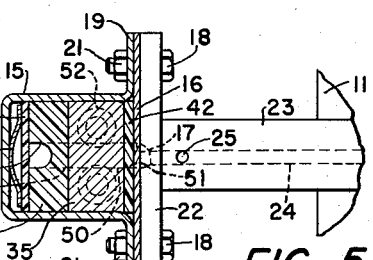
Fig. 5 is an enlarged sectional view taken substantially along the line 5—5 of Fig. 1.

The moistening apparatus is normally mounted in a cotton harvester housing in a position shown in U. S. Patent 2,795,096 issued to R. A. Mier. For purposes of the present disclosure, it is sufficient to recognize that the moistener is adjacent to the cotton picker spindle drum whereby spindle 10 may move adjacent and in contact with moistening pads 11 of the moistening apparatus.

The fluid distributing mechanism comprises basically an outer housing or case composed of an upright and elongated U-shaped sheet metal tube 15 closed on its open side by a wall structure 16. The wall or wall structure 16 has a series of vertically spaced ports 17. The U-shaped portion 15 of the housing or case is connected to the wall structure 16 by means of bolts 18 which pass through the wall structure 16 through flanges 19, 20 on the portion 15. Nuts 21 are provided for use with the bolts 18. The bolts 18 also serve as means connecting flange portions 22 of outwardly extending rigid elements 23 which serve as brackets for carrying the moistener pads 11. The brackets 23 are provided with conduit means 24, one end of which is in register with the ports 17 and the opposite end of which feeds into the pads 11. The brackets 23 are provided with air bleeding passages 25, the purpose of which permits the air to be bled from the passage 24 so as to permit fluid to pass through the passage or conduit 24. The housing or case 15 is closed at its lower end by an end plate 30 which is welded or otherwise fixed to the sides of the U-shaped member 15, and at its upper end a circular pan-shaped structure 31. The structure 31 is welded, as at 32 to the upper edges of the U-shaped member 15 and wall structure 16. The member 31 also has upwardly extending flanges, as at 33, forming an opening 34 through which a reciprocating or oscillating member 35 may move. Also provided in the structure 31 is a boss or coupling 36 to which a fluid carrying pipe 37 may be connected.

Within the enclosure or case 15 is disposed upright strips of nylon 40, 41, and 42. The nylon strip 41 has a vertical groove or hollow portion 43 with vertically spaced passages or outlets 44 extending from the groove to the opposite face of the nylon strip 41 where the outlets 44 open internally of the case or column 15. As may be seen, the strip 40 closes the open side of the groove 43 and forms with the strip 41 a hollow central portion which operates as a fluid reservoir for receiving the fluid passing through the pipe 37. The lower end of the groove 43 is closed by the plate 30. The nylon plate 40 is held firmly against the nylon member 41 by means of an elongated spring steel strip 45 which braces itself against the cross piece of the U-shaped member 15.

Positioned in the space between the nylon strip 41 and the wall structure 16 and its adjacent nylon strip 42 is the reciprocating member 35. The reciprocating member 35 has therein a series of vertically spaced pockets 50 which, as will later become apparent, operate as metering reservoirs for the moistening pads. The pockets 50 extend from the face of the nylon strip 41 to the face of the nylon strip 42, the latter having openings or apertures 51 in registry with the ports 17 in the wall structure 16. The purpose of the material of strips 40, 41, and 42 being preferably nylon is because of the reduced weight as well as providing better surfaces for the reciprocating member 35 to operate against. The lower end of the reciprocating element 35 is biased against downward movement by means of a spring 52 which is disposed between the lower end and the plate 30. The member 35 is reciprocated by means of a cam or eccentric 55 which is mounted on and rotates about the axis of a shaft 56. The shaft 56 is rotated either directly from the main drive on the cotton harvester or through other suitable drive means. The nature of the exact drive is not important for purposes of the present invention.

Figure 3:
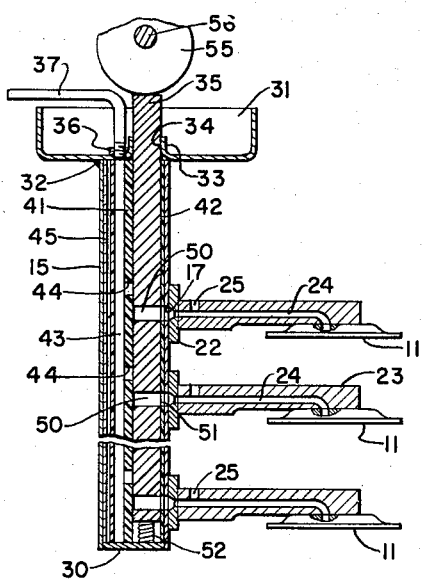
Fig. 3 is an enlarged sectional view taken substantially along the line 3—3 of Fig. 2.
Figure 4:
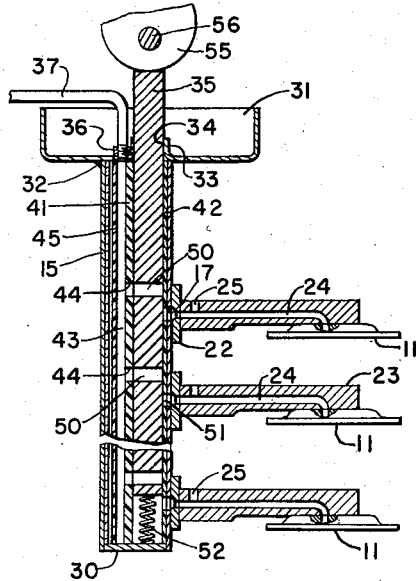
Fig. 4 is a sectional view similar to Fig. 3 but showing a different position of the mechanism.

The moistening mechanism operates in the following manner. Liquid will be fed in the pipe 37 and groove 43 so as to cause the latter to remain constantly full of liquid. It will be noted that the outlets 44, pockets 50 and ports 17, although vertically offset, are all vertically spaced apart on the order of one another. Consequently, the reciprocating member 35 may move to a position in which the pockets 50 register with the outlets 44 or to a position in which the pockets are in register with the ports 17 and openings 51. In the former or first position the ports 17 and openings 51 are closed by the reciprocating element 35 and in the latter or second position the outlets 44 are closed. Upon the eccentric 55 being in a position shown in Fig. 4, the pockets 50 are in the first position and fluid in the hollow or central portion of the nylon strip 41 will pass into the pockets 50. As the eccentric 55 then moves into a position as shown in Fig. 3, the pockets 50 will operate as a metering device and carry the fluid or liquid in the pockets to a position adjacent the openings 51 and ports 17 so that the fluid contained therein will flow through the conduit passages 24 to the moistening pads 11. Upon the eccentric or cam 55 rotating again to a position shown in Fig. 4, the spring 52 will bias the reciprocating element upwardly so that its upper end is constantly in contact with the cam surface on the eccentric 55. Consequently, the reciprocating element 35 will reciprocate between a position in which the pockets 50 are adjacent the outlets 44 and a position in which the pockets 50 are adjacent the ports 17. In operation, should it be desired to add or reduce the moisture to the pads 11, the shaft 56 may be adjusted to rotate at a faster or slower rate of speed depending upon the quantity of moisture desired to be placed in the pads 11, or the element 35 may be removed and replaced with a similar element having larger or smaller pockets 50, the latter features, not being shown, but being a mere matter of design over the described form of the invention.

While only one form of the invention has been shown, it should be recognized that other forms and variations may be apparent to those skilled in the art. It should therefore be understood that while the preferred form has been concisely set forth in detail for the purpose of clearly illustrating the principles of the invention, it is not desired to so limit or narrow the invention beyond the broad general principles disclosed and as set forth in the appended claims.

What is claimed is:

1. A moistener assembly for a cotton harvester comprising: an upright and elongated case having an upright wall structure formed with a plurality of vertically spaced ports; a plurality of outwardly extending elements attachable to the case adjacent the ports, each of the elements having pad means thereon and conduit means opening to the adjacent port to effect communication from internally of the case to the respective pad means; a hollow upright columnar structure positioned internally of the case and spaced from the wall structure and having a plurality of vertically spaced outlets communicating with the hollowed portion of the columnar structure, said outlets being vertically offset from the ports in the wall structure; a vertically disposed reciprocable member positioned in the space between the columnar structure and wall structure and having a plurality of pockets therein opening to the columnar structure and the wall structure; means reciprocating the reciprocable member between a first position in which each of the pockets is in register with one of the outlets and the ports are closed, and a second position in which each of the pockets is in register with one of the ports and the outlets are closed; and means supplying fluid to the hollow central portion of the columnar structure.

2. A moistener assembly for a cotton harvester comprising: an upright and elongated case having an upright wall structure formed with a plurality of vertically spaced ports; a plurality of outwardly extending elements attachable to the case adjacent the ports, each of the elements having pad means thereon and conduit means opening to the adjacent port to effect communication from internally of the case to the respective pad means; a hollow upright columnar structure positioned internally of the case and spaced from the wall structure and having a plurality of vertically spaced outlets communicating with the hollowed portion of the columnar structure, said outlets being offset from the ports in the wall structure; a vertically disposed oscillatable member positioned in the space between the columnar structure and wall structure and having a plurality of pockets therein opening to the columnar structure and the wall structure; means oscillating the member between a first position in which each of the pockets is in register with one of the outlets and the ports are closed, and a second position in which each of the pockets is in register with one of the ports and the outlets are closed; and means supplying fluid to the hollow central portion of the columnar structure.

3. A moistener assembly for a cotton harvester comprising: an elongated case having wall structure formed with a plurality of longitudinally spaced ports; a plurality of outwardly extending elements attachable to the case adjacent the ports, each of the elements having pad means thereon and conduit means opening to the adjacent port to effect communication from internally of the case to the respective pad means; a hollow columnar structure positioned internally of the case and spaced from the wall structure and having a plurality of longitudinally spaced outlets communicating with the hollowed portion of the columnar structure, said outlets being offset from the ports in the wall structure; a longitudinally disposed reciprocable member positioned in the space between the columnar structure and wall structure and having a plurality of pockets therein opening to the columnar structure and the wall structure; means reciprocating the member between a first position in which each of the pockets is in register with one of the outlets and the ports are closed, and a second position in which each of the pockets is in register with one of the ports and the outlets are closed;

and means supplying fluid to the hollow central portion of the columnar structure.

4. A moistener assembly for a cotton harvester comprising: an elongated case having an upright wall structure formed with a plurality of vertically spaced ports; a plurality of outwardly extending elements attachable to the case adjacent the ports, each of the elements having pad means thereon and conduit means opening into the adjacent port to effect communication from internally of the case to the respective pad means; a hollow upright columnar structure positioned internally of the case and spaced from the wall structure and having a plurality of vertically spaced outlets communicating with the hollowed portion of the columnar structure, said outlets being vertically offset from the ports in the wall structure; a vertically disposed member positioned in the space between the columnar structure and wall structure and having a plurality of pockets therein opening to the columnar structure and wall structure; means moving the member between a first position in which each of the pockets is in register with one of the outlets and the ports are closed and a second position in which each of the pockets is in register with one of the ports and the outlets are closed; and means supplying fluid to the hollow central portion of the columnar structure.

5. A moistener assembly for a cotton harvester comprising: an upright wall structure formed with a plurality of vertically spaced ports; a plurality of outwardly extending elements attachable to the structure adjacent the ports, each of the elements having pad means thereon and conduit means opening into the adjacent port to effect communication through the port to the respective pad means; a hollow upright columnar structure spaced from the wall structure and having a plurality of vertically spaced outlets communicating with the hollowed portion of the columnar structure, said outlets being vertically offset from the ports in the wall structure; a vertically disposed member positioned in the space between the columnar structure and wall structure and having a plurality of pockets therein opening to the columnar structure and wall structure; means moving the member between a first position in which each of the pockets is in register with one of the outlets and the ports are closed and a second position in which each of the pockets is in register with one of the ports and the outlets are closed; and means supplying fluid to the hollow central portion of the columnar structure.

6. A moistener assembly for a cotton harvester comprising: an upright wall structure formed with a plurality of vertically spaced ports; a plurality of outwardly extending elements attachable to the structure adjacent the ports, each of the elements having pad means thereon and conduit means opening into the adjacent port to effect communication through the port to the respective pad means; structure spaced from the wall structure and having a plurality of vertically spaced outlets, said outlets being vertically offset from the ports in the wall structure; a vertically disposed member positioned in the space between the structure with the outlets and wall structure and having a plurality of pockets therein opening to each of the structures; means moving the member between a first position in which the pockets are in register with the outlets and the ports are closed and a second position in which the pockets are in register with the ports and the outlets are closed; and means supplying fluid to the outlets.

7. A moistener assembly for a cotton harvester comprising: wall structure formed with a plurality of spaced apart ports; a plurality of outwardly extending elements attachable to the structure adjacent the ports, each of the elements having pad means thereon and conduit means opening into the adjacent port to effect communication through the port to the respective pad means; structure spaced from the wall structure and having a plurality of spaced outlets, said outlets being offset from the ports in the wall structure; a member positioned in the space between the structure with the outlets and wall structure and having a plurality of pockets therein opening to each of the structures; means moving the member between a first position in which the pockets are in register with the outlets and the ports are closed and a second position in which the pockets are in register with the ports and the outlets are closed; and means supplying fluid to the outlets.

8. A moistener assembly for a cotton harvester comprising: structure formed with a plurality of spaced ports; a plurality of elements attachable to the structure, each of the elements having pad means thereon and conduit means opening into the ports to effect communication through the ports to the pad means; structure spaced from the aforesaid structure forming a plurality of fluid outlets; a fluid reservoir communicating with the outlets; a metering member positioned in the space between the structure having the ports and the structure having the outlets, said member having a plurality of pockets therein; and means associated with said member movable in one position to effect communication between the pockets and the outlets for passing fluid into the pockets and to prevent communication between the pockets and the ports, and in a second position to effect communication between the pockets and the ports for passing fluid from the pockets into the conduit means and to prevent communication between the outlets and the pockets.

9. A moistener assembly for a cotton harvester comprising: structure formed with a plurality of spaced ports; a plurality of elements attachable to the structure, each of the elements having pad means thereon and conduit means opening into the ports to effect communication through the ports to the pad means; structure spaced from the aforesaid structure forming a plurality of fluid outlets; a fluid reservoir communicating with the outlets; a metering member positioned in the space between the structure having the ports and the structure having the outlets, said member having a plurality of pockets therein; and means associated with said member movable in one position to effect communication between the pockets and the outlets for passing fluid into the pockets, and in a second position to effect communication between the pockets and the ports for passing fluid from the pockets into the conduit means.

10. A moistener assembly for a cotton harvester comprising: structure formed with a plurality of spaced ports; a plurality of elements attachable to the structure, each of the elements having pad means thereon; conduit means between the ports and the pad means effective to permit communication through the ports to the pad means; structure forming a fluid reservoir; a metering member positioned adjacent the structure having the ports, said member having a plurality of pockets therein; and means associated with said member movable to successively effect communication between the pockets and the fluid reservoir for passing fluid into the pockets to the exclusion of communication between the pockets and the ports, and communication between the pockets and the ports for passing fluid from the pockets into the conduit means to the exclusion of communication between the fluid reservoir and the pockets.

11. The invention defined in claim 10 in which the structure forming the fluid reservoir includes therein wall means having a series of fluid outlets therein, the structure having the ports includes wall means, the member with the pockets is sandwiched between the wall means containing the outlets and the ports, and the means movable to effect the communication between the reservoir and pockets and pockets and ports respectively is such as to create relative movement between the wall means and member whereby said pockets will first be disposed opposite said outlets to afford flow of fluid into the pockets and will then be disposed opposite said ports to afford flow of fluid from said pockets through said ports.

12. The invention defined in claim 11 in which the wall means are upright and the ports are vertically offset from the outlets; the member is rigid and upright; and the means effecting relative movement between the member and wall means is a cam operative against one end of the member to effect vertical oscillating movement of the member.

13. The invention defined in claim 12 in which the member is biased at its opposite end from the cam to cause the member to remain in contact with the cam.

14. The invention defined in claim 10 further characterized by air bleeding means in the assembly effective to bleed air from the fluid so as to permit an even flow of fluid to the moistening pads.

No references cited.